No. 810,486. PATENTED JAN. 23, 1906.
A. HARRISON.
VAPOR GENERATOR.
APPLICATION FILED AUG. 1, 1904.

Witnesses:
J. B. Weir
Robert H. Weir

Inventor
Amos Harrison
By John W. Hill
Atty.

UNITED STATES PATENT OFFICE.

AMOS HARRISON, OF CHICAGO, ILLINOIS, ASSIGNOR OF ONE-FOURTH TO ROBERT H. WALCH, OF CHICAGO, ILLINOIS.

VAPOR-GENERATOR.

No. 810,486.  Specification of Letters Patent.  Patented Jan. 23, 1906.

Application filed August 1, 1904. Serial No. 219,007.

*To all whom it may concern:*

Be it known that I, AMOS HARRISON, a citizen of the United States of America, residing at Chicago, in the county of Cook and State of Illinois, have invented a new and useful Vapor-Generator, of which the following is a description.

My invention relates to a form of generator having one or more porous layers of incombustible material arranged to be heated by the burning of a suitable combustible, the products thereof passing through said material and mingling with vapor produced by discharging a liquid upon said heated material. The quantity of liquid employed is regulated so that it will not serve to cool the material below the vaporizing-point of the liquid.

The object of my invention is to produce a device of the kind described in a practical and durable structure effective in operation and free from the danger of explosions.

To this end it consists in the novel construction, arrangement, and combination of parts herein shown and described, and more particularly pointed out in the claims.

Figure 1:
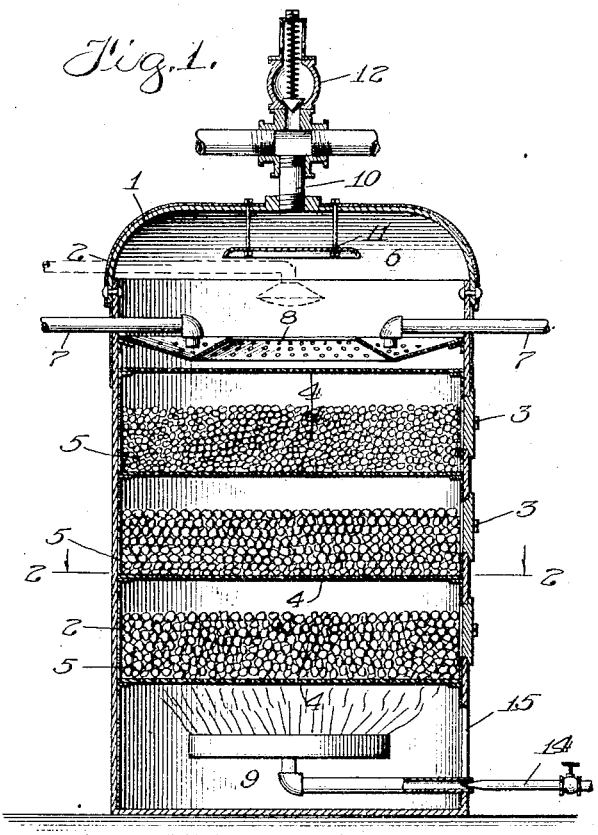
Figure 2:
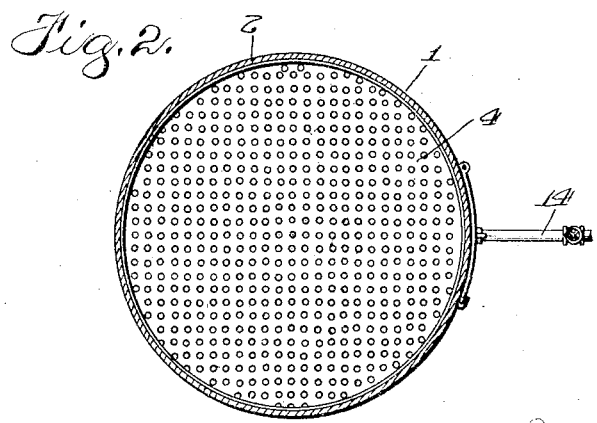

In the accompanying drawings, wherein like or similar reference characters indicate like or corresponding parts, Figure 1 is a vertical diametrical section of my device, and Fig. 2 is a transverse section taken on line 2 2 of Fig. 1.

In the preferred form of my device shown in the drawings, 1 is the outer shell or casing of my generator, which may be provided with heat-insulating covering 2, either internally or externally, as desired. The doors 3 3 are provided for giving convenient access to the interior of my device, and the perforated partitions 4 4, one or more of which may be employed, as desired, are arranged to extend transversely across the shell and attach thereto in any suitable manner.

The porous layers of incombustible material 5 5 are each preferably composed of a bed of small pieces or blocks of iron, copper, fire-brick, magnesia, or equivalent material of regular or irregular form, but preferably of such a size and form that the interstices between the pieces will afford sufficient draft and a free passage of the products of combustion through the layers into the chamber 6 at the upper part of the shell and for the percolation of liquid, preferably water, introduced by the pipes 7 7 or equivalent means, spread by a foraminated annular trough 8 or other suitable means over the surface of the upper porous layer. In other words, the layers form one or more porous vaporizing-bodies for a purpose hereinafter described.

A burner 9 of any preferred form for effectually heating the layers 5 is provided, preferably arranged to employ oil or gas as fuel; but any means for maintaining the temperature of the porous layers at a point where the liquid upon coming in contact therewith will be promptly vaporized may be employed.

An outlet-pipe 10 is arranged to communicate with the chamber 6, and a baffle-plate or diaphragm 11 is arranged within the chamber 6 before the opening to the outlet-pipe 10 to prevent a sudden rush of vapor thereto from carrying an undesirable quantity of the liquid into the pipe 10. If desired, a safety-valve 12 may be arranged either upon the outlet-pipe 10, as shown, or at any other convenient point, and a valve 14 may be arranged upon the supply-pipe to the burner 9 to regulate the supply of combustible and intensity of the heat. Where it is desired to generate a vapor at atmospheric pressure only, the opening 15 may be made in the shell 1 to permit of free access of air to the burner; but where it is desired to have the vapor generated under greater pressure it is evident that the shell must be made tight to prevent the loss of pressure and air and the combustible forced into the shell, as required by some suitable means.

The operation of my device is as follows: First a flame is started at the burner 9 and the porous layers heated to a suitable temperature, after which water or other liquid in quantities insufficient to cool the porous layers below the vaporizing-point of the liquid is introduced by means of the pipes 7 or equivalent means and spread or sprayed by the trough 8 over the layers of material. The liquid upon coming in contact with the heated layers of material is at once vaporized and raises into the chamber 6. The hot products of combustion from the burner 9 also pass through the porous layers into the chamber 6, and after mixing with the vapor from the liquid the two may pass out by means of the pipe 10 and be employed for any purpose desired.

It is obvious that, if preferred, the liquid may be sprayed over the vaporizing-body. Any preferred means may be employed for this purpose. A spraying device is shown in dotted lines in Fig. 1 of the drawings, and such a construction or equivalent means may be employed either alone or in connection with the distributing - trough described above.

In the foregoing only the preferred form of my device is described and illustrated in the drawings; but it is evident that many immaterial modifications may be made without departing in the least from the spirit and scope of my invention. Hence I do not wish to be understood as limiting myself to the exact form and construction shown.

Having thus described my invention, what I claim as new, and desire to secure by Letters Patent, is—

1. A vapor-generator comprising a chamber, an incombustible porous body arranged within said chamber, and means for maintaining combustion within said chamber to heat said porous body, in combination with means for showering a liquid upon said heated body, and means for drawing off the steam and gases of combustion.

2. A vapor-generator comprising a chamber, an incombustible porous body arranged within the chamber, and means for continuously introducing material for supporting combustion into said chamber, whereby said porous body is heated to a suitable temperature, in combination with means for showering a liquid upon said porous body, and means for drawing off the commingled steam and gases of combustion.

3. A vapor-generator comprising an inclosing shell provided with a transverse vaporizing-partition dividing the shell into a vapor-dome above and a combustion-chamber below the same, a burner below the partition arranged to heat the same to a vaporizing temperature and means for permitting the products of combustion to pass to the vapor-dome, in combination with means for delivering a fluid to the vaporizing-partition and means for drawing off the resultant gases.

4. A vapor-generator comprising an inclosing shell provided with a transverse vaporizing-partition dividing the shell into a vapor-dome above and a combustion-chamber below the same, said combustion-chamber being open to atmospheric pressure, a burner arranged below the partition to heat the same to a vaporizing temperature, and means for permitting the products of combustion to pass to the vapor-dome, in combination with means for delivering a fluid to the vaporizing-partition and means for drawing off the resultant gases.

5. A vapor-generator comprising an inclosing shell provided with a transverse vaporizing-partition dividing the shell into a vapor-dome above and a combustion-chamber below the same, a burner below the partition arranged to heat the same to a vaporizing temperature and means for permitting the products of combustion to pass to the vapor-dome, in combination with means for delivering a fluid to the vaporizing-partition, a pipe for drawing off the commingled vapor and products of combustion, and a baffle-plate arranged before the entrance to said pipe.

6. A device of the kind described, comprising the combination of a suitable shell one or more porous vaporizing-bodies extending horizontally across said shell each consisting of a plurality of blocks of incombustible material, means for supporting the same, means for maintaining combustion within a portion of said shell to heat said blocks to a vaporizing temperature and means for thoroughly distributing a liquid upon the upper surface of the heated blocks, thereby producing a vapor within the shell composed of steam and the products of combustion.

7. A device of the kind described, comprising the combination of a shell provided with a covering of heat-insulating material one or more porous layers of incombustible material extending horizontally across said shell, a burner adapted to maintain combustion within said shell for heating said porous layers, means for distributing a liquid upon the upper surface of said heated porous layers thereby producing within the shell a heating medium composed of vapor mixed with the products of combustion.

8. A device of the kind described, comprising the combination of a shell provided with a covering of heat-insulating material, one or more layers of incombustible material extending horizontally across said shell, a burner adapted to maintain combustion within said shell for heating said layers, means for supplying said burner with a suitable combustible material, means for showering a liquid upon the upper surface of said heated layers thereby producing within the shell a heating medium composed of vapor mixed with the products of combustion.

9. A device of the kind described, comprising the combination of a suitable shell, one or more layers extending horizontally across said shell, each consisting of a plurality of blocks of incombustible material, means for supporting the same, means for maintaining combustion within said shell to heat said blocks, a foraminated trough arranged within said shell above said blocks adapted to shower a liquid discharged therein upon the upper surface of said heated blocks, thereby producing a vapor within the shell composed of steam and the products of combustion.

10. A device of the kind described, comprising the combination of a shell provided with a covering of heat-insulating material, one or more layers extending horizontally across said shell each layer consisting of a plurality of blocks of incombustible material, means for supporting the same, a burner adapted to maintain combustion within said shell for heating said blocks and means for supplying said burner with a suitable combustible material, a foraminated trough adapted to shower a liquid discharged therein upon the upper surface of said heated blocks, thereby producing a vapor within the shell composed of steam and the products of said combustion.

11. A device of the kind described, comprising the combination of a suitable shell provided with a covering of heat-insulating material, a discharge-pipe connected to said shell a baffle-plate arranged before the opening to said discharge-pipe, one or more layers of incombustible vaporizing material extending horizontally across said shell, a burner adapted to maintain combustion within said shell for heating said layers, and means for showering a liquid upon said heated layers, thereby producing a vapor within the shell composed of steam and the products of combustion.

12. A device of the kind described, comprising the combination of a suitable shell provided with a covering of heat-insulating material, a discharge-pipe connected to said shell, a baffle-plate arranged before the opening to said discharge-pipe, one or more layers extending horizontally across said shell each layer consisting of a plurality of blocks of incombustible vaporizing material, means for supporting the same, one or more burners adapted to maintain combustion within said shell for heating said blocks, means for supplying said burner with a suitable combustible material, a foraminated trough adapted to shower a liquid discharged therein upon the upper surface of said heated blocks, thereby producing a vapor within the shell composed of steam and the products of said combustion.

In testimony whereof I have hereunto signed my name in the presence of two subscribing witnesses.

AMOS HARRISON.

Witnesses:
BURTON U. HILLS,
CHARLES I. COBB.